Nov. 26, 1963 H. J. ORR ETAL 3,112,392
MICRO WIRE GUN AND CABLE ASSEMBLY
Filed Oct. 20, 1960 4 Sheets-Sheet 4
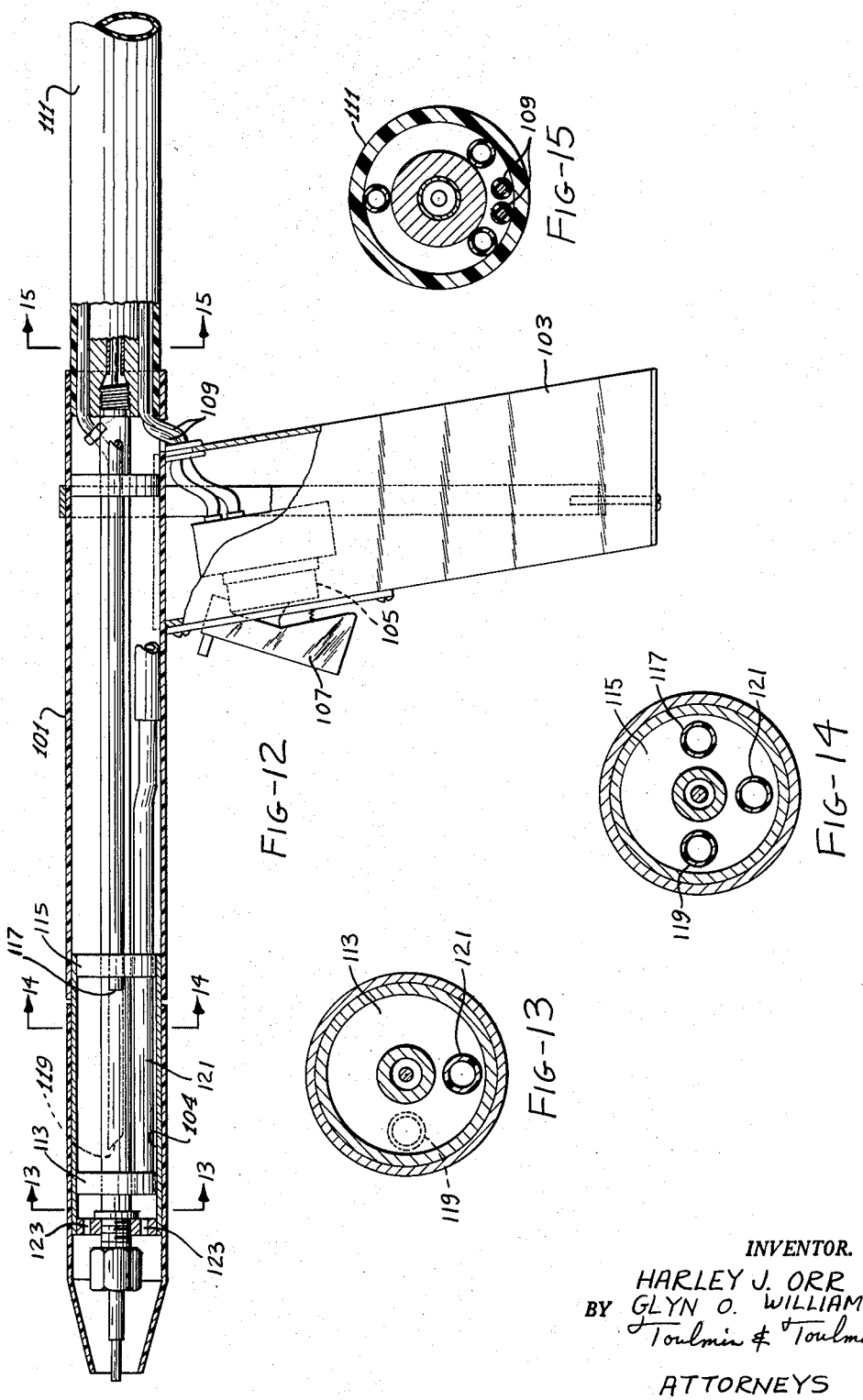
INVENTOR.
HARLEY J. ORR
BY GLYN O. WILLIAMS
Toulmin & Toulmin
ATTORNEYS

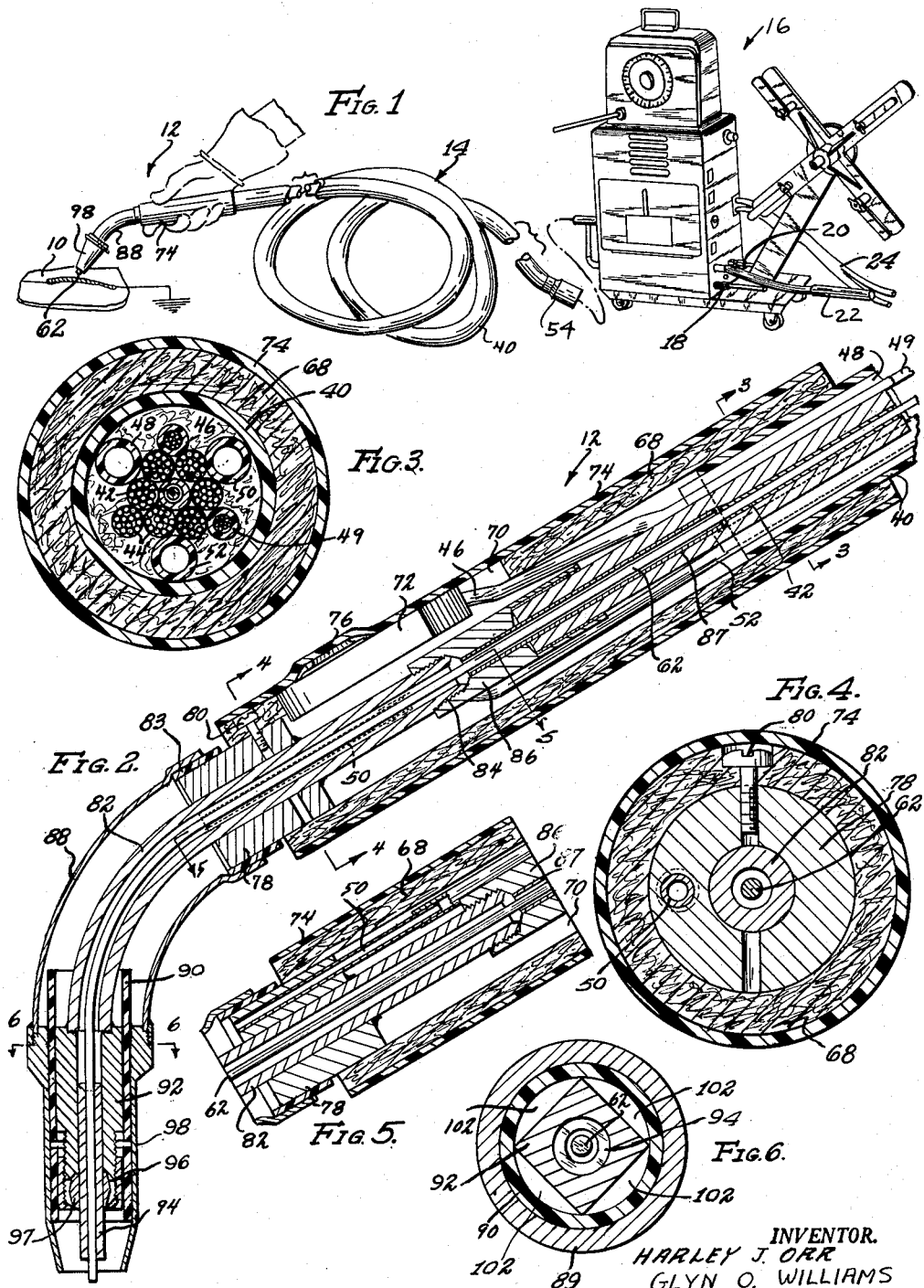

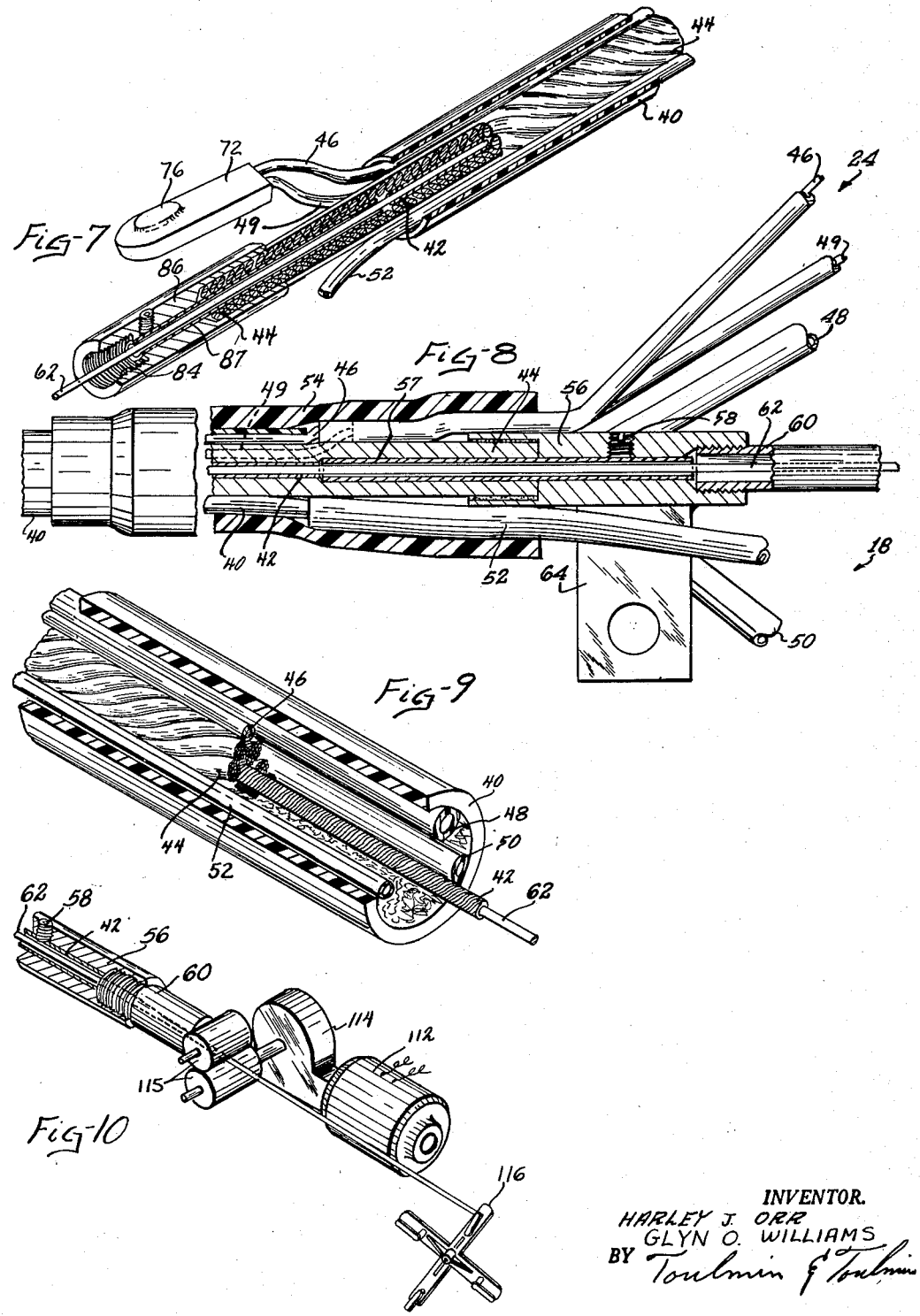

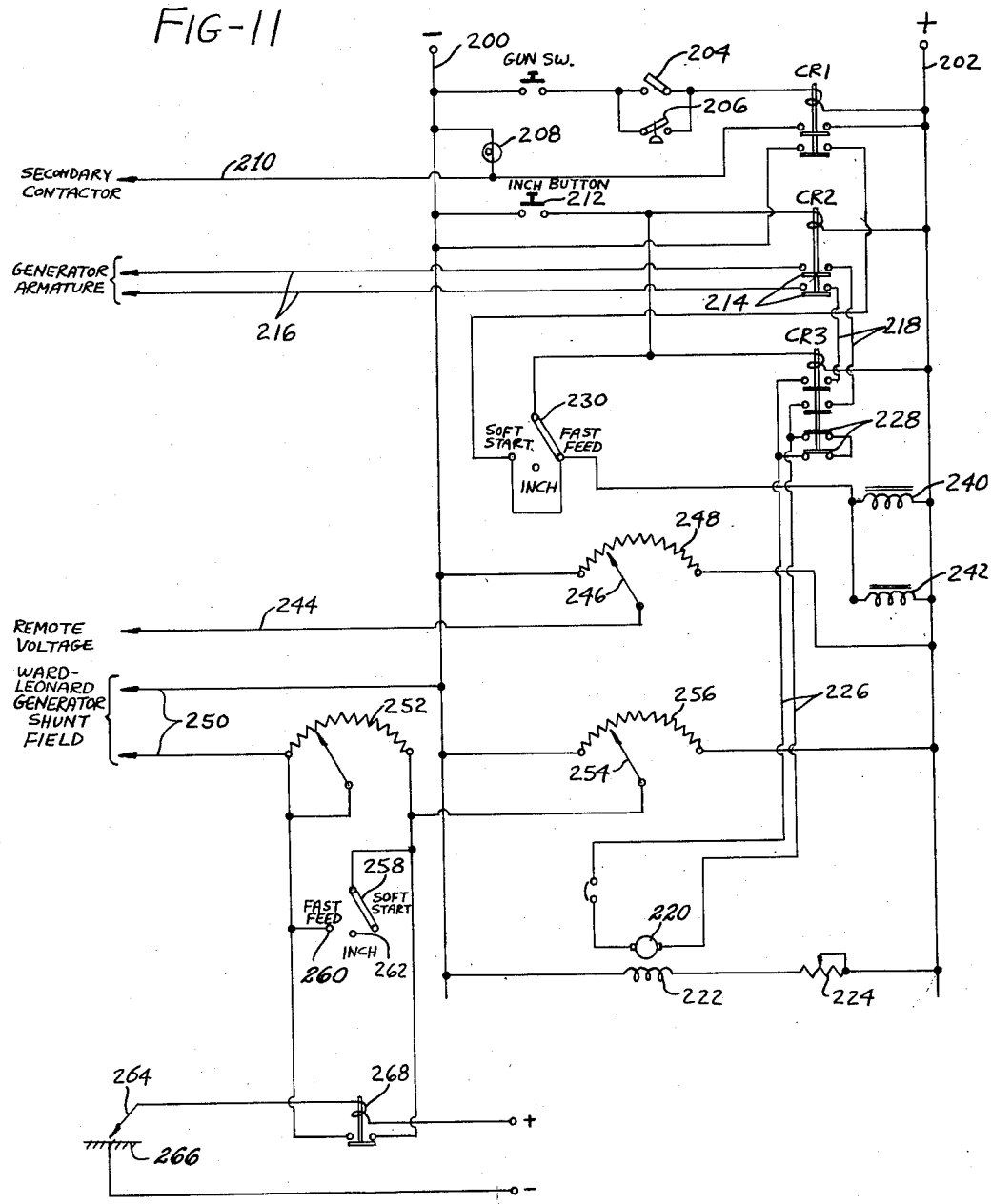

United States Patent Office 3,112,392
Patented Nov. 26, 1963

3,112,392
MICRO WIRE GUN AND CABLE ASSEMBLY
Harley J. Orr, Tipp City, and Glyn O. Williams, Troy, Ohio, assignors to Hobart Brothers Company, Troy, Ohio, a corporation of Ohio
Filed Oct. 20, 1960, Ser. No. 63,892
6 Claims. (Cl. 219—130)

This invention relates to welding equipment and is particularly concerned with an improved welding gun and cable especially adapted for welding thin members but useful also for making heavy welds.

The welding of extremely thin members and heavier sections in out of position and hard to get at places is accomplished with considerable difficulty and requires careful control of the feed of the welding rod or wire and a careful blanketing of the welding region as by carbon dioxide or argon or mixtures of carbon dioxide and argon or other known gases suitable for this purpose.

This has led to the development of welding guns through which a relatively fine wire can be fed while simultaneously a shielding gas can also be fed through the cable and gun assembly. Heretofore, it has been customary to connect the wire-feed, the gas supply and the water supply, when used, to the welding gun by way of independent cables or wires. This of course makes a most inconvenient device to use, particularly when the wires and cables reach any considerable length and consequently such welding guns and cables have heretofore been awkward to handle.

It is also usually the case that water cooling of the welding gun is employed and that the control of the feeding of the welding wire through the welding gun is accomplished by a switch mounted on the welding gun so as to be readily accessible to the operator. These require additional pipes and wires and since they are ordinarily supplied as independent members, this still further complicates the use of a welding gun and cable of the nature referred to.

Having the foregoing in mind, a primary object of the present invention is the provision of a greatly improved welding gun and unitary cable structure which is extremely light in weight by means of which welding operations can be carried out with great facility, particularly welding operations on extremely thin work members and in hard-to-get-at places wherein a welding wire is fed through the welding gun.

A particular object of this invention is the provision of an improved cable which is unitary in nature but which has a plurality of channels therethrough for the conveying through the cable and welding gun of the welding current, the circuit for the control relay which starts and stops the wire feed motor, starts and stops the gas and water flow and which causes the welding contactor to open and close, and the conduit for gas and liquid that may be used for cooling or blanketing purposes.

A still further object of this invention is the provision of a simple, light weight welding gun of the nature referred to, to which a unitary cable means is attached which is readily adjustable to accommodate the welding gun to various particular circumstances.

Still another object of this invention is the provision of a welding gun and cable of the nature referred to in which water can be run through the cable and gun, when desired, for cooling purposes but which water is completely sealed off from the outside of the welding gun and cable whereby no possibility of leakage occurs and wherein the water is also completely sealed off from the electrical components so that there is no danger of short circuiting any part of the electrical apparatus.

A still further object is the provision of a unitary cable for use with a welding gun of the nature referred to and which cable, while providing for a plurality of electrical and fluid channels, is relatively small in size and weight and highly flexible so that it can be manipulated freely and without being so stiff as to interfere with movements of the welding gun.

The foregoing object as well as still other objects and advantages of this invention will become more apparent upon reference to the following specification taken in connection with the accompanying drawings in which:

FIGURE 1 is a diagrammatic view showing a welding gun of the present invention with a cable according to this invention attached thereto in use illustrating diagrammatically the several connections to the welding unit;

FIGURE 2 is a sectional view through the welding gun itself drawn at somewhat enlarged scale;

FIGURE 3 is a cross sectional view indicated by line 3—3 on FIGURE 2 toward the cable end of the welding gun;

FIGURE 4 is a cross sectional view indicated by line 4—4 on FIGURE 2 toward the outer end of the welding gun;

FIGURE 5 is a longitudinal sectional view indicated by line 5—5 on FIGURE 2;

FIGURE 6 is a cross sectional view indicated by line 6—6 on FIGURE 2;

FIGURE 7 is a perspective view partly cut away showing the welding gun end of the cable and the wire feed control switch attached thereto;

FIGURE 8 is a fragmentary view showing the end of the cable opposite the welding gun and the manner in which the several electrical and fluid connections are led into the cable;

FIGURE 9 is a fragmentary perspective view partly broken away showing the construction of the cable intermediate the ends thereof;

FIGURE 10 is a more or less diagrammatic view illustrating the manner in which the welding wire could be fed into the cable and therethrough to the welding gun;

FIGURE 11 is a more or less diagrammatic layout of the electrical system that is under the control of the switch carried by the welding gun;

FIGURE 12 is a longitudinal sectional view through a welding gun with a pistol grip handle and also showing water cooling; and FIGURES 13, 14 and 15 are cross-sectional views thereof indicated by lines 13—13, 14—14, and 15—15, respectively, on FIGURE 12.

Referring to the drawings somewhat more in detail FIGURE 1 shows work 10 that is to be welded. This welding is carried out by a welding gun generally indicated at 12 to which is attached an elongated flexible cable generally indicated at 14. At the end of the cable opposite the gun the cable is connected to a wire feed mechanism 16. There are also gas and water supply conduit 18 and 20. These lead through the wire feed mechanism 16 to cable 14. There is also a pair of wires 24 that control the motor for the wire feed mechanism, and the welding current supply cable 22 leading through the wire feed mechanism to cable 14.

The cable itself which is illustrated in detail in FIGURE 9 and comprises an outer plastic tubular wall 40 and extending along the axis of the cable is a wire guide tube 42 consisting of closely wound music wire so as to obtain the maximum flexibility while still properly guiding the wire 62 fed therethrough. This element is without joints from end to end so that there will be no hindrance to the passage of the wire 62 through the wire guide tube 42.

Grouped about the center wire guide tube 42 are the flexible stranded conductors 44 making up the welding cable. These wires are extra flexible and are composed of individual bare wires twisted together.

In connection with the particular cable illustrated the wires 44 are seven in number, comprising a triangular group of six wires immediately surrounding the wire guide tube 42 and a single stranded wire forming one of the apexes of the triangular group in the center of the cable. The other apexes of the triangle consist of the conductors 46 and 49 which are insulated and which are the conductors leading to the control switch in the welding gun at one end and to the controls in the wire feed mechanism at the other end.

Also located inside the tubular outer casing 40 are three plastic tubes 48, 50, and 52. Tubes 48 and 50 are for the purpose of supplying water to the gun, when it is of the water cooled type, and for returning the water therefrom whereas tube 52 is for the purpose of supplying gas such as carbon dioxide or argon or mixtures thereof as well as other known gases suitable for this purpose to the tip of the gun for shielding the welding arc.

The space remaining inside the tubular outer cover 40 around the several wires and conductors and tubes referred to is filled with a filler material such as jute or the like. The resulting cable is relatively light and is flexible enough that it can readily be manipulated and provides a smooth unobstructed passage along the axis thereof for the wire to be fed therethrough.

At the end of the cable opposite the gun there is mounted on the cable a flexible cable jacket member 54 which fits over the outer covering 40 of the cable and into which cable jacket the several conductors and tubes and the like referred to above are led. At the outer end of the cable jacket 54 is a member 56 fixedly connected with the stranded wires 44 making up the welding current conducting portion of the cable and which member 56 is also centrally bored for receiving guide tube 57 which extends to the rear end of the wire guide tube 42 and which is retained in place within the member 56 by the set screw 58. At its outer end the member 56 has connected therewith tube 60 through which the welding wire 62 is fed into the cable. Member 56 also has attached thereto a large conductive lug 64 by means of which electrical connection of the source of welding current is made with the member and therethrough with the wires 44.

The aforementioned tubes 48, 50, and 52 are sealingly connected with conduits leading thereto for supplying the water and gas referred to.

The electric wires 46 and 49 also lead into plastic sleeves and are thus properly protected along the portions thereof that are outside the cable.

At the gun end of the cable, the cable is received within the insulated handle 68 of the gun and the outer casing or cover 40 of the cable extends into the said handle. Handle 68 is provided with an aperture 70 in which rests a switch 72 that is connected with the aforementioned wires 46 and 49. The entire handle is enclosed by a molded plastic tight fitting handle cover 74 which engages the handle from end to end and which encloses the aperture 70 and switch 72. The operating button 76 of the switch can be actuated by applying pressure to the handle cover. The switch may be positioned on top for thumb actuation or on the bottom for finger actuation.

At its outer end handle 68 is connected with the metal adapter member 78 as by the attaching screw 80. Adapter member 78 is received in and is soldered to the curved metal tube 82 that extends into the handle to be threadedly connected at 84 to a metal connector member 86 which at its other end is joined with the wires 44 making up the conductor for the welding current. Connector member 86 is also centrally bored to receive guide tube 87 which receives the welding wire from the wire tube or sleeve 42 through which the wire is sent along the cable to the welding gun.

The adapter member 78 also supports by way of insulating sleeve 83 the curved metal sleeve 88 which curves downwardly at the forward end of the welding gun. At its outer end sleeve 88 supports nozzle member 98. Inside nozzle member 98 are the insulating sleeves 90 in which is a metal body portion 92. Body portion 92 at its upper end is soldered to the outer end of the curved tubular member 82 carried by adapter 78. Slidably mounted in the bore in body portion 92 is a contact tube 94 adapted for being clamped adjustably in position therein by the clamp nut 96 which exerts closing force on a split collet 97. This contact tube closely receives the welding wire.

Also slidably mounted on the insulator sleeve 90 is a gas nozzle 98 which screws into sleeve 88.

As will be seen in FIGURE 4, the tube 50 through which gas is delivered to the welding region passes through the adapter member 78. Gas is thus delivered to the inside of the tube 88. As will be seen in FIGURE 6, the body part 92 is polygonal in shape thus leaving spaces 102 through which gas can pass from inside curved tube 88 downwardly into the inside of the gas nozzle 98 and thus be supplied therethrough to the tip of the gun for shielding the welding operation.

In practice, the contact tube 94 will extend outwardly from the end of the gas nozzle about ⅛″ and the welding wire will project outwardly from the end of the contact tube about 3/16″.

The actual wire feeder can be of any known type and, as illustrated in FIGURE 10, may comprise reduction gearing 114 driven by motor 112 and which reduction gearing drives feed rolls 115 which feeds the wire from spool 116 into the tube 60 attached to the member 56 and from which the welding wire will pass into the wire feed tube 42.

It will be noted that the entire outside of the cable and welding gun is of insulating material and thus is not energized including the gas nozzle 98 at the tip of the gun which is clamped about the insulating sleeve 90. The welding current passes through the welding cable made up of the wires 44 and then through the connector member 86 into the curved tube 82. This curved tube is silver soldered to the rectangular or polygonal block 92 which in turn is slidably connected with the contact sleeve 94. The welding current thus flows through the tube and the block into the contact sleeve and thence into the welding wire adjacent the end thereof that is being utilized for depositing the weld on the material being welded. The entire outer surface of the gun is thus "dead" and the gun becomes simple and safe to use and manipulate and no particular care need be taken about the gun accidentally contacting other articles in the region of the place being welded.

Any suitable source of welding current could be utilized such as a motor generator type welder or a transformer type welder with rectifiers. Welding of the nature carried out by the device of this invention, however, is generally very low energy welding with the welding voltage D.C. straight or reverse polarity at approximately 17.5 volts and a welding current of approximately 60-amperes for .035 diameter wire. Wire sizes may vary however from about .020″ to .045″, as welding voltage could be as high as 20 volts or more with amperages of 200 or more. The set of welding values given would be applicable to a 16-gauge mild steel fillet weld, for example. In a case of this nature the contact tube would extend beyond the nozzle of the gun approximately ⅛ of an inch. The length of wire from the end of the contact tube to the top of the arc would be approximately 3/16 of an inch. The arc length is estimated to be approximately ⅛ of an inch. Weld metal transfers from the welding electrode to the work piece in a near globular fashion. The pulses of transfer of metal range from approximately 50 to 200 per second.

In general, the welder power source for this process is of a constant voltage nature. The rate of wire feed speed is held constant which results in a substantially constant welding current which fluctuates with the frequency of droplet transfer as the droplets of metal transfer from the welding electrode to the work piece.

With reference to the supply of water to the welding gun this is not always done and in such cases the water tubes remain idle within the cable. However, when water is supplied, it is circulated through the hollow handle of a welding gun somewhat different than the welding gun above described.

A welding gun of this nature is illustrated in FIGURES 12 through 15. This welding gun has a straight main portion 101 and a pistol grip 103. Either the water cooled or the air cooled type welding gun could be constructed in this manner or either of the welding guns could be constructed of the curved type illustrated in FIGURE 2. It will be understood therefor, neither of the illustrations of FIGURES 2 or 12 is intended to be in any way limiting.

In FIGURE 12, the pistol grip 103 embodies a switch 105 under the control of a trigger 107. This switch is connected with the control wires 109 that lead from the gun through the cable 111 of the present invention.

In FIGURE 12 the interior of the main portion of the body 104 is provided with spaced partitions 113 and 115 and the water pipes in the cable lead through partition 115 with one pipe terminating at 117 and the other pipe terminating at 119. This permits a supply of water to circulate through the welding gun near the tip for cooling purposes. It should be evident that the inclusion of the water pipe in any of the cables also has the advantageous effect of cooling the cable as well as the welding gun.

The gas conduit cable 111 leads completely through both partitions 113 and 115. This gas conduit is indicated at 121 and it opens on the left side of diffuser partition 113 and communicates by way of passages 123 with the tip of the welding gun.

In all other respects, the welding gun of FIGURES 12 through 15 and the cable leading therefrom and the wire feed mechanism and the supply of welding current is the same as has been described in connection with the first modification.

FIGURE 11 shows a control circuit for use in combination with this invention having negative and positive lines 200 and 202 respectively.

Between these lines is a first contactor CR1 which is in series with the previously mentioned switch on the gun which is indicated at 72 in FIGURE 2 and at 105 in FIGURE 12. Also in series with the contactor coil CR1 and the gun switch is a selector switch 204 and in parallel therewith is a pressure switch 206. When the water cooled gun is employed switch 204 is left open and when water pressure is supplied to the gun, switch 206 will close. When the gun is of the air cooled type there is no pressure to cause switch 206 to close and switch 204 is, accordingly, moved to its closed position.

A signal light 208 is provided which indicates when the secondary contactor, which is under the control of contactor CR1, closes. This contactor has a blade that controls the signal light 208 and which blade also closes on a wire 210 leading to a contactor that closes to initiate the supply of welding current to the gun.

A second contactor CR2 has its coil connected between the main supply lines in series with a normally opened inch button 212. This contactor has a pair of blades 214 that are connected with the wires 216 that lead to the generator armature of a Ward-Leonard system. On the opposite side of the blade 214 from wires 216 there are wires 218 that lead through blades of a third contactor CR3 to the armature 220 of the wire feed motor. This wire feed motor has a field 222 connected between the supply lines and being provided with a field resistor 224. The field of the wire feed motor can be adjusted by resistor 224 while the speed of the motor is controlled by varying the armature current, said armature being connected into the Ward-Leonard system.

It will be noted that the wires 226 leading from the armature 220 to relay CR3 are provided with means for short circuiting the armature to brake the feed motor to a halt when CR3 is dropped open. This is in the form of blade means 228 of relay CR3 which is closed when the relay is deenergized which effects the aforementioned interconnection between the wires 226.

The inch button 212 when closed will energize the coils of relays CR2 and CR3. This inch button is normally operated with a selector switch 230 positioned in its intermediate position on the inch contact which is not connected to any other part of the circuit.

When switch 230 is set either on its fast feed position or on its soft start position, energization of the coils of contactor CR2 and CR3 is accomplished by closing of contactor CR1.

The circuit leading to the coils of the relays CR2 and CR3 also includes in the circuit the gas valve solenoid 240 and the water valve solenoid 242.

The remote control of the welding voltage is accomplished by way of a wire 244 leading to the adjustable arm 246 of a rheostat 248 connected between the supply lines.

The generator shunt field of the Ward-Leonard system previously referred to is controlled by way of wires 250 one of which is connected with the negative power line 200 and the other of which is connected with one end of a rheostat 252, the other end of said rheostat being connected with the arm 254 with the rheostat 256 is connected between the power lines 200 and 202.

The opposite ends of rheostat 252 are interconnected by a switching arrangement which includes an arm 258 connected with one end of rheostat 252 and a contact point 260 connected with the other end of the said rheostat with there being an inch contact 262 which is not connected to any other part of the circuit.

When the arm 258 is in the position in which it is illustrated in FIGURE 11, the wire feed motor commences slow and when the wire, indicated at 264 in FIGURE 11 contacts the work 266, a contactor 268 is energized which closes and bypasses rheostat 252 so that the wire feed motor can then commence to run at the preselected speed.

If this feature is not desired, the arm 258 is swung over on contact 260 and the wire feed motor will commence operating instantly at its selected speed.

The circuit described above is a typical example of the circuit associated with a welding arrangement according to the present invention.

The arrangement of the present invention, it will be evident, is particularly well adapted for welding thin gage materials. Heavier material, however, can be welded by taking multiple passes thereacross and a heavy solid bead of welding material can thus be built up.

It will be understood that this invention is susceptible to modification in order to adapt it to different usages and conditions; and, accordingly, it is desired to comprehend such modifications within this invention as may fall within the scope of the appended claims.

We claim:
1. In a hand electric welding gun; a hollow rigid body adapted for connection with a cable at one end, a block fixedly mounted in and closing the other end of the body, a metal tube fixed in and extending through the block, a metal contact tube mounted on the outer end of said metal tube coaxial therewith and axially adjustable thereon adapted for closely receiving a welding wire fed through the metal tube, connector means electrically connecting the inner end of said metal tube with conductor means in the cable to supply welding current through the metal tube and contact tube to said wire, and a wire guide tube in the said connector means communicating coaxially with said metal tube for receiving welding wire from the cable and supplying it to said metal tube and contact tube.

2. In a hand electric welding gun; a hollow rigid body adapted for connection with a cable at one end, a block fixed in and closing the other end of the body, a metal tube fixed in and extending through the block, a metal contact tube axially adjustably mounted on the outer end of said metal tube coaxially therewith adapted for closely receiving a welding wire fed through the metal tube, tubular connector means coaxial with said metal tube and electrically connecting the inner end of said metal tube with conductor means in the cable to supply welding current through the metal tube and contact tube to said wire, a wire guide tube in the said connector means on the axis thereof communicating with said metal tube for receiving welding wire from the cable and supplying it to said metal tube and contact tube, a gas jacket mounted on the block extending along said metal tube and contact tube in surrounding relation thereto and open at the outer end for the supply of shielding gas to the welding wire where it emerges from the contact tube, and a gas tube extending through said block adapted for connection with a gas supply tube in said cable.

3. In a hand electric welding gun; a hollow rigid body adapted for connection with a cable at one end, a block fixed in and closing the other end of the body, a metal tube fixed in and extending through the block, a metal contact tube axially adjustably mounted on the outer end of said metal tube coaxial therewith adapted for closely receiving a welding wire fed through the metal tube, means electrically connecting the inner end of said metal tube with conductor means in the cable to supply welding current through the metal tube and contact tube to said wire, a gas tube extending through said block adapted for connection with a gas supply tube in said cable, said block being sealed to said body, and a second block sealed to said body in spaced relation to the first mentioned block to define a closed space in the body whereby water can be circulated through said body for cooling purposes.

4. In a hand electric welding gun; a hollow rigid body adapted for connection with a cable at one end, a block fixed in and closing the other end of the body and projecting from the end of said body, a metal tube fixed in and extending through the block, a metal contact tube axially adjustably mounted on the outer end of said metal tube coaxial therewith adapted for closely receiving a welding wire fed through the metal tube, tubular connector means electrically connecting the inner end of said metal tube with conductor means in the cable to supply welding current through the metal tube and contact tube to said wire, a wire guide tube in the said connector means coaxial with and communicating with said metal tube for receiving welding wire from the cable and supplying it to said metal tube and contact tube, a gas jacket mounted on the end of said block which projects from the end of said body extending along said metal tube and contact tube in surrounding spaced relation thereto and open at the outer end for the supply of shielding gas to the welding wire where it emerges from the contact tube, and a gas tube extending through said block adapted for connection with a gas supply tube in said cable, the connection of the contact tube with the metal tube comprising a metal member in the gas jacket having longitudinal channels therein for the passage of gas therealong, said metal member being fixed at one end to the end of the metal tube and having chuck means at the other end for adjustable clamping engagement with said contact tube.

5. In a hand electric welding gun; a hollow rigid body adapted for connection with a cable at one end, a block fixed in and closing the other end of the body and projecting from the end of said body, a metal tube fixed in and extending through the block, a metal contact tube axially adjustably mounted on the outer end of said metal tube coaxial therewith adapted for closely receiving a welding wire fed through the metal tube, tubular connector means electrically connecting the inner end of said metal tube with conductor means in the cable to supply welding current through the metal tube and contact tube to said wire, a wire guide tube in the said connector means coaxial with and communicating with said metal tube for receiving welding wire from the cable and supplying it to said metal tube and contact tube, a gas jacket mounted on the end of said block which projects from said body extending along said metal tube and contact tube in spaced surrounding relation thereto and open at the outer end for the supply of shielding gas to the welding wire where it emerges from the contact tube, a gas tube extending through said block adapted for connection with a gas supply tube in said cable, the connection of the contact tube with the metal tube comprising a metal member in the gas jacket having longitudinal channels therein for the passage of gas therealong, said metal member being fixed at one end to the end of the metal tube and having chuck means at its other end adapted for adjustable clamping engagement with said contact tube.

6. In a hand electric welding gun; a hollow rigid body adapted for connection with a cable at one end, a block fixed in and closing the other end of the body and projecting from the end of said body, a metal tube fixed in and extending through the block, a metal contact tube axially adjustably mounted on the outer end of said metal tube adapted for closely receiving a welding wire fed through the metal tube, tubular connector means electrically connecting the inner end of said metal tube with conductor means in the cable to supply welding current through the metal tube and contact tube to said wire, a wire guide tube in the said connector means coaxial with and communicating with said metal tube for receiving welding wire from the cable and supplying it to said metal tube and contact tube, a gas jacket mounted on the end of said block which projects from said body and extending along said metal tube and contact tube in spaced surrounding relation thereto and open at the outer end for the supply of shielding gas to the welding wire where it emerges from the contact tube, a gas tube extending through said block adapted for connection with a gas supply tube in said cable, the connection of the contact tube with the metal tube comprising a metal member in the gas jacket having longitudinal channels therein for the passage of gas therealong, said metal member being fixed at one end to the end of the metal tube and having chuck means at its other end for adjustable clamping engagement with said contact tube, an aperture in the side wall of said body adjacent said block, a switch in the aperture for connection with wires leading through the cable and having a pressure operable control element toward the outside, and a sealing sleeve of resilient electrical insulating material surrounding said body and extending over said aperture and switch and engaging the control element of the switch, said sealing sleeve sealingly engaging said body and being sufficiently thin and flexible to permit actuation of the switch by application of pressure to the outside of said sleeve in the region of said control element.

References Cited in the file of this patent

UNITED STATES PATENTS

| | | |
|---|---|---|
| 1,953,915 | Burgett et al. | Apr. 3, 1934 |
| 2,360,743 | Tuttle | Oct. 17, 1944 |
| 2,433,588 | Wreford | Dec. 30, 1947 |
| 2,510,204 | Baird | June 6, 1950 |
| 2,510,205 | Baird | June 6, 1950 |
| 2,666,832 | Landis et al. | Jan. 19, 1954 |
| 2,727,970 | Turbett | Dec. 20, 1955 |
| 2,736,787 | Welch | Feb. 28, 1956 |
| 2,881,305 | Wojciak et al. | Apr. 7, 1959 |
| 2,952,766 | Craig et al. | Sept. 13, 1960 |